United States Patent
Hiraiwa et al.

(10) Patent No.: US 7,181,763 B2
(45) Date of Patent: Feb. 20, 2007

(54) AUTHENTICATION APPARATUS, AUTHENTICATION SYSTEM, AND AUTHENTICATION METHOD

(75) Inventors: Akira Hiraiwa, deceased, late of Yokohama (JP); by Yumiko Hiraiwa, legal representative, Yokohama (JP); Hiroyuki Manabe, Yokosuka (JP); Kouki Hayashi, Yokosuka (JP); Takashi Ninjouji, Yokohama (JP); Toshiaki Sugimura, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 649 days.

(21) Appl. No.: 10/682,720

(22) Filed: Oct. 10, 2003

(65) Prior Publication Data

US 2004/0133811 A1 Jul. 8, 2004

(30) Foreign Application Priority Data

Oct. 11, 2002 (JP) ............................ P2002-299264

(51) Int. Cl.
*H04L 9/32* (2006.01)
*G06K 9/00* (2006.01)

(52) U.S. Cl. .......................................... 726/2; 382/115
(58) Field of Classification Search .................... 726/2, 726/18; 382/115; 713/186
See application file for complete search history.

(56) References Cited

U.S. PATENT DOCUMENTS 6,961,448 B2 * 11/2005 Nichols et al. ............. 382/115

2002/0138767 A1* 9/2002 Hamid et al. ............... 713/202
2003/0028784 A1* 2/2003 Uchida ....................... 713/186

FOREIGN PATENT DOCUMENTS

| JP | 2001-178707 | 7/2001 |
| WO | WO 98/12670 | 3/1998 |
| WO | WO 99/27485 | 6/1999 |

OTHER PUBLICATIONS

D. Chance, et al., "Unsupervised Mapping of Biometric Signatures for Enhanced Computer Security", Proceedings of the IASTED International Conference, Artificial Intelligence and Applications, Sep. 4-7, 2001, pp. 86-88.

* cited by examiner

*Primary Examiner*—Nasser Moazzami
*Assistant Examiner*—Shanto M Z Abedin
(74) *Attorney, Agent, or Firm*—Oblon, Spivak, McClelland, Maier & Neustadt, P.C.

(57) ABSTRACT

An object is to provide an authentication apparatus with improved effect of preventing unauthorized use, which is applied to personal equipment carrying out a predetermined function. This authentication apparatus includes a functional part carrying out a predetermined function to be used by a user, an electromyogram acquiring part for measuring a change of an electromyogram caused by a motion of a muscle of the user, and a state transition part for implementing a transition into a state in which the user can use the predetermined function of the functional part, according to authentication of the user based on the result of the measurement.

3 Claims, 9 Drawing Sheets

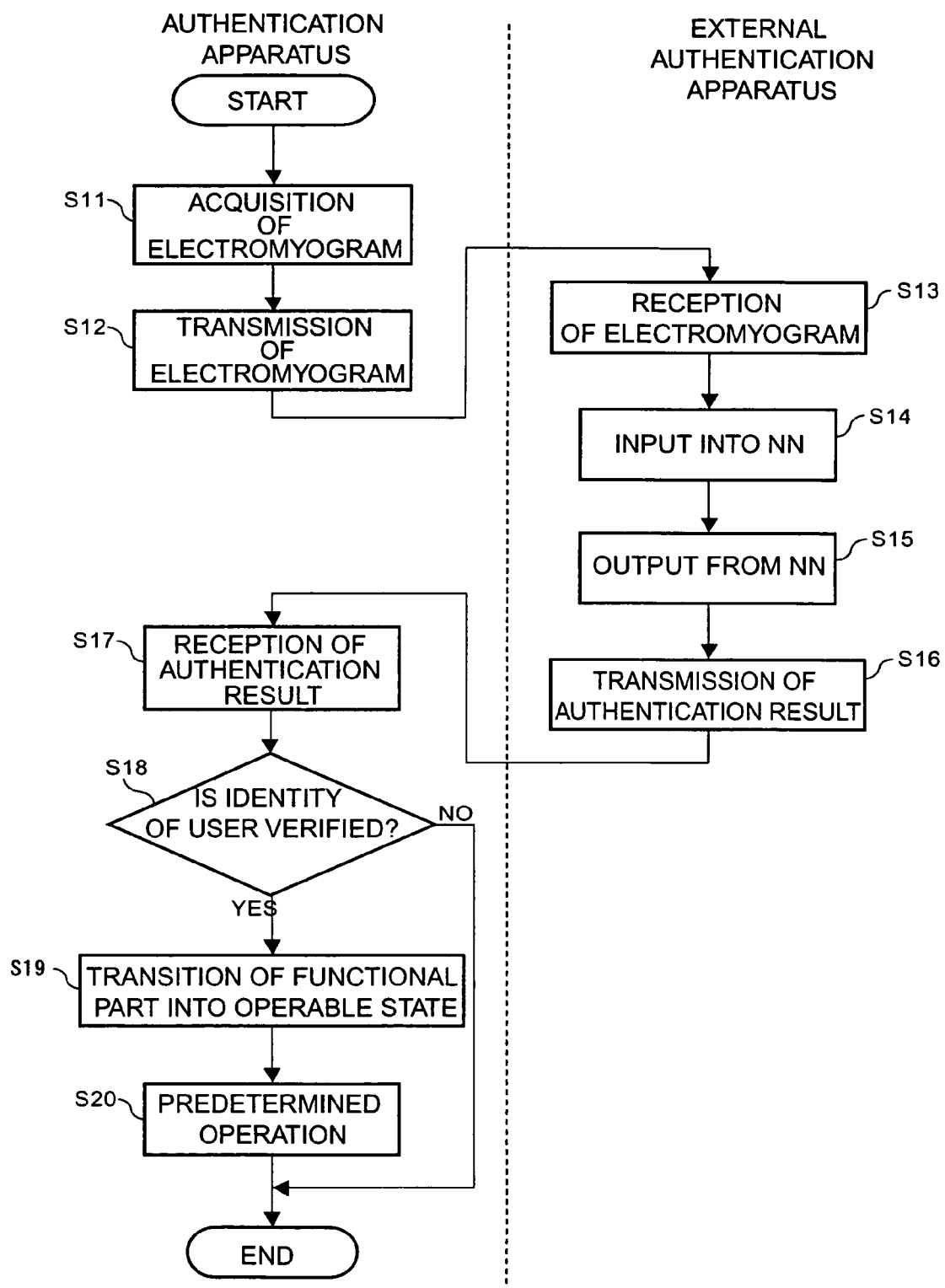

AUTHENTICATION APPARATUS, AUTHENTICATION SYSTEM, AND AUTHENTICATION METHOD

BACKGROUND OF THE INVENTION

1. Field of the Invention

The present invention relates to an authentication apparatus, an authentication system, and an authentication method.

2. Related Background Art

A variety of personal authentication techniques for authenticating individual living organisms such as human beings have been proposed heretofore according to types of biological information. For example, such techniques include authentication by fingerprints, authentication by iris or retinal patterns of eyes, and authentication by voiceprints. Further authentication techniques based on other biological information are those making use of change in an electromyogram caused by motion of muscles of living organisms (e.g., reference is made to Patent Document 1).

[Patent Document 1] Japanese Patent Application Laid-Open No. 2001-178707

SUMMARY OF THE INVENTION

Nowadays, personal information equipment with predetermined functions like wireless phones, PDAs (Personal Digital Assistances), and multifunctional watches is in widespread use, and a method of entering a password is adopted as means for preventing the personal information equipment from being used by unauthorized people. However, the passwords could be stolen and can be insufficient as means for preventing the unauthorized use in certain cases.

An object of the present invention is, therefore, to provide an authentication apparatus, an authentication system, and an authentication method applied to the personal equipment with predetermined functions and achieving improved effect of preventing the unauthorized use.

Inventors of the present invention investigated the application of biometrics such as the authentication by fingerprints, the authentication by iris or retinal patterns of eyes, and the authentication by voiceprints, instead of the entry of passwords as means for preventing the unauthorized use of personal information equipment with predetermined functions. However, the fingerprints are easy to forge, and in the case of the iris or retinal patterns, they are not easy to forge, but could induce crimes of taking out eyeballs of others. Namely, Inventors found in the process of investigation that even a dead could be authenticated with static data such as the fingerprints or the iris or retinal patterns. Particularly, Inventors found that the static data is not suitable for the personal information equipment with predetermined functions, because it is often carried by each user. The voiceprints are dynamic data, but Inventors found in the process of investigation that authentication error could occur when the user suffers a sore throat from a cold and that the voiceprints are susceptible to ambient noise. Particularly, the personal information equipment with predetermined functions is often used outside offices and homes while being carried by each user, and it is thus at risk of occurrence of authentication error, which was also found by Inventors. The present invention has been accomplished on the basis of these knowledge.

An authentication apparatus of the present invention comprises a functional part carrying out a predetermined function to be used by a user; electromyogram acquiring means for measuring a change in an electromyogram caused by a motion of a muscle of the user; transmitting means for transmitting a result of the measurement by the electromyogram acquiring means, to a predetermined destination apparatus; receiving means for receiving a result of authentication of the user returned based on the result of the measurement transmitted; and state transition means for implementing a transition into a state in which the user can use the predetermined function of the functional part, according to the received user's authentication result based on the measurement result.

According to the authentication apparatus of the present invention, the transition into the usable state of the predetermined function is implemented according to the result of the authentication of the user based on the change of the electromyogram, whereby it becomes feasible to achieve the authentication of the user more securely. For example, if this authentication apparatus is applied to the personal information equipment, the possibility of the unauthorized use by third parties can be effectively reduced, without need for the user to enter a password. Since the apparatus is configured to transmit the measured electromyogram to the predetermined destination apparatus and receive the result of the authentication in response to the transmission, it becomes feasible to authenticate the user by authentication means in the destination apparatus, for example.

An authentication system of the present invention comprises a functional part carrying out a predetermined function to be used by a user; electromyogram acquiring means for measuring a change of an electromyogram caused by motion of a muscle of the user; transmitting means for transmitting a result of the measurement by the electromyogram acquiring means, to a predetermined destination apparatus; authentication means for carrying out authentication of the user, based on the result of the measurement transmitted; receiving means for receiving a result of the authentication; and state transition means for implementing a transition into a state in which the user can use the predetermined function of the functional part, according to the result of the authentication received.

According to the authentication system of the present invention, the transition into the usable state of the predetermined function is implemented according to the result of the authentication of the user based on the change of the electromyogram, whereby it becomes feasible to achieve the authentication of the user more securely. For example, if this authentication system is applied to a system consisting of the personal information equipment and an authentication server, the possibility of the unauthorized use by third parties can be effectively reduced, without need for the user to enter a password.

An authentication method according to the present invention comprises an electromyogram acquiring step wherein electromyogram acquiring means measures a change of an electromyogram caused by motion of a muscle of a user; a transmitting step wherein transmitting means transmits a result of the measurement by the electromyogram acquiring means, to a predetermined destination apparatus; a receiving step wherein receiving means receives a result of authentication of the user returned based on the result of the measurement transmitted; and a state transition step wherein state transition means implements a transition into a state in which the user can use a predetermined function of a functional part, according to the result of the authentication received.

According to the authentication method of the present invention, the transition into the usable state of the predetermined function is implemented according to the result of the authentication of the user based on the change of the electromyogram, whereby it becomes feasible to achieve the authentication of the user more securely. For example, if this authentication method is applied to the authentication in the personal information equipment, the possibility of the unauthorized use by third parties can be effectively reduced, without need for the user to enter a password. Since the method is configured to transmit the measured electromyogram to the predetermined destination apparatus and receive the result of the authentication in response to the transmission, it becomes feasible to authenticate the user by authentication means in the destination apparatus, for example.

The present invention will become more fully understood from the detailed description given hereinbelow and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention may be more readily described with reference to the accompanying drawings, in which:

FIG. 9 is an illustration showing a method of carrying out authentication with the authentication system as an embodiment of the present invention;

DESCRIPTION OF THE PREFERRED EMBODIMENTS

The knowledge of the present invention can be readily understood in view of the following detailed description with reference to the accompanying drawings presented for illustration only. Subsequently, embodiments of the present invention will be described with reference to the accompanying drawings. The same portions will be denoted by the same reference symbols as much as possible, without redundant description.

Figure 1:
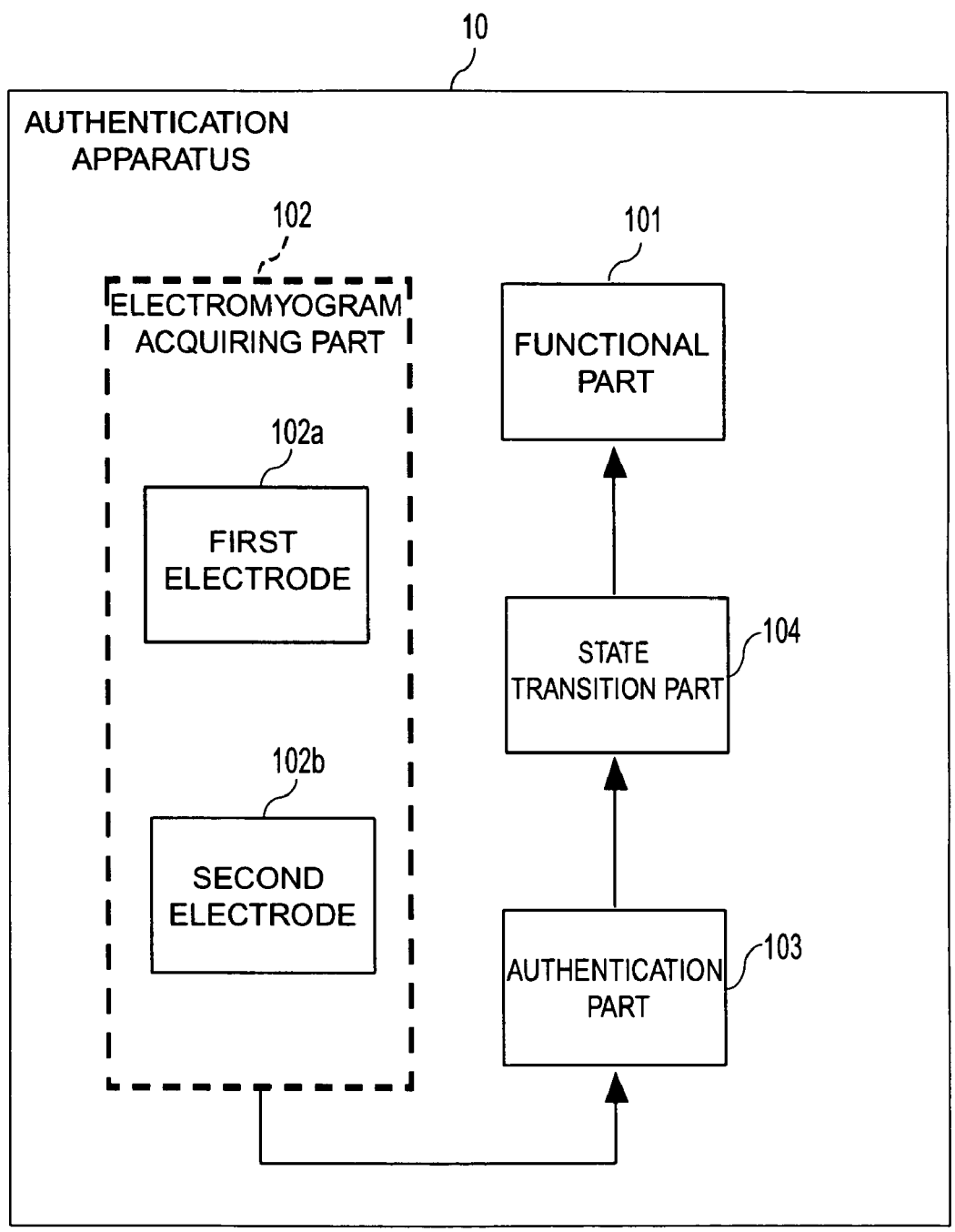
FIG. 1 is an illustration for explaining an authentication apparatus according to an embodiment of the present invention.

An authentication apparatus as a first embodiment of the present invention will be described with reference to FIG. 1. FIG. 1 is an illustration for explaining authentication apparatus 10. The authentication apparatus 10 is physically constructed as personal information equipment provided with a CPU (central processing unit), memories such as RAM and ROM, electrodes for measurement of the electromyogram, a functional part carrying out a predetermined function, and so on. The predetermined function is one set according to a function required of the authentication apparatus 10, and is properly selected from such functions as a clock function, a telephone function, a data management function, and a television telephone function. Therefore, the authentication apparatus 10 functions as a watch in the case of the predetermined function being the clock function, functions as a wireless phone in the case of the predetermined function being the telephone function, or functions as a PDA (Personal Digital Assistance) in the case of the predetermined function being the data management function.

The authentication apparatus 10 includes as functional components, functional part 101, electromyogram acquiring part (electromyogram acquiring means) 102, authentication part (authentication means) 103, and state transition part (state transition means) 104. Subsequently, each of the components will be detailed below.

Functional part 101 is a portion that carries out a predetermined function to be used by the user of the authentication apparatus 10, and portion that carries out such functions as the watch function, telephone function, data management function, and television telephone function. Functional part 101 is configured so that its functions cannot be used in its steady state, and so that the functions become usable in accordance with an instruction signal from state transition part 104.

Electromyogram acquiring part 102 is a portion that measures a change of an electromyogram caused by motion of a muscle of the user: Specifically, electromyogram acquiring part 102 includes a pair of electrodes, first electrode 102a and second electrode 102b, and outputs a change of myoelectricity measured by first electrode 102a and second electrode 102b, as an electromyogram to authentication part 103. Although in the present embodiment the electromyogram acquiring part 102 is comprised of a pair of electrodes, it may be comprised of plural pairs of electrodes.

Figure 2:
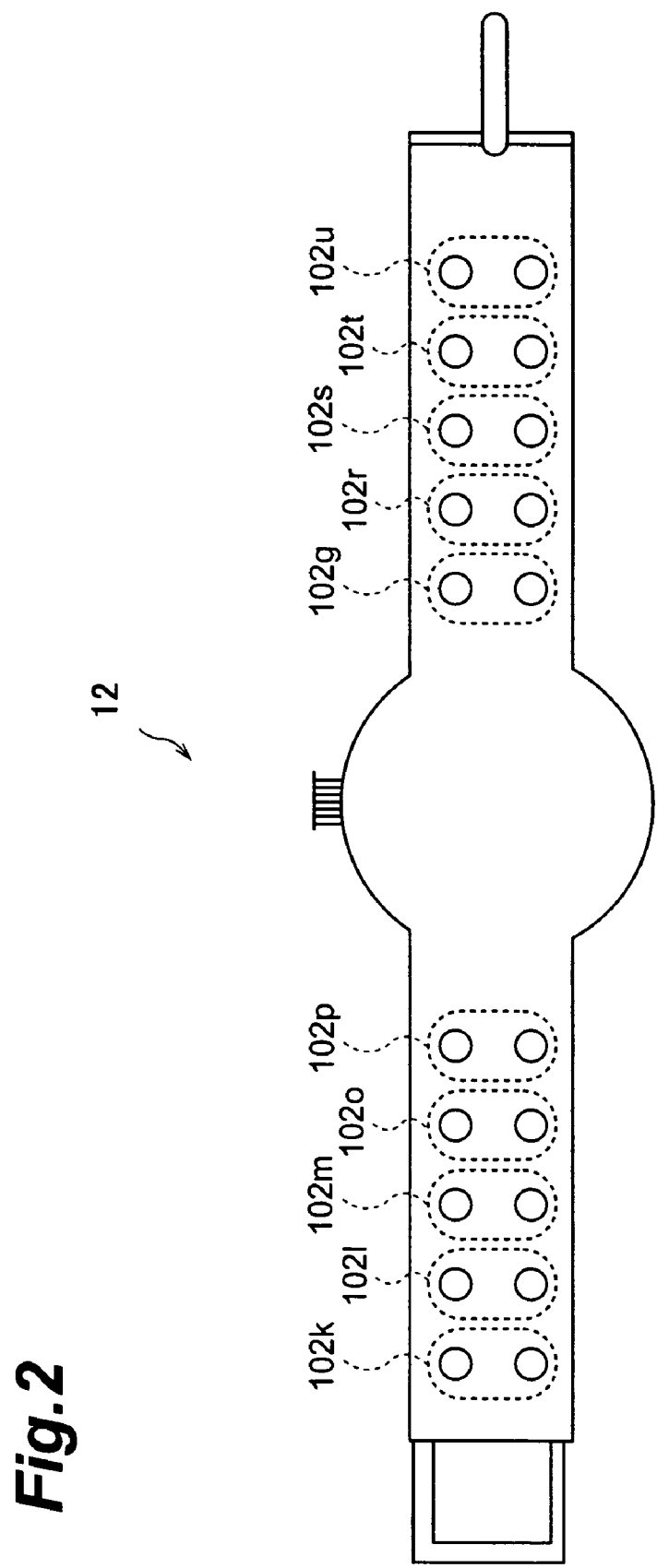
FIG. 2 is an illustration for explaining another authentication apparatus according to an embodiment of the present invention.
Figure 3:
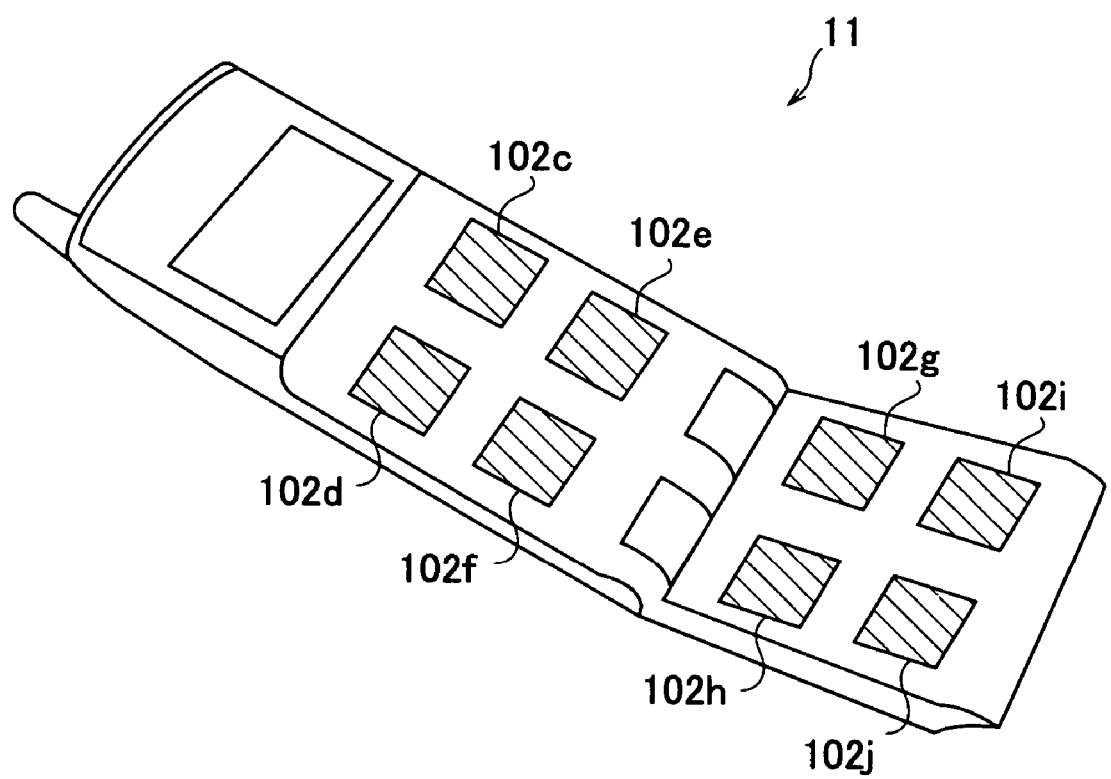
FIG. 3 is an illustration for explaining still another authentication apparatus according to an embodiment of the present invention.

In a preferred configuration with plural pairs of electrodes, for example as shown in FIG. 2, the electromyogram acquiring part has ten pairs of electrodes 102k–102u inside a watch strap. In this configuration, when watch 12 is mounted on a wrist, the electrodes 102k–102u are brought into close contact with the skin to be able to measure an electromyogram. In another preferred configuration, as shown in FIG. 3, the electromyogram acquiring part has electrodes 102c–102j at predetermined locations in wireless phone 11. In this configuration, when the user makes a call or the like with wireless phone 11 at the position in a normal use state, the electrodes 102c–102j are brought into close contact with portions corresponding to such muscles as the musculus orbicularis oris, musculus zygomaticus major, and musculus digastricus, to be able to measure the electromyogram.

Authentication part 103 is a portion that carries out authentication of the user, based on the electromyogram acquired by electromyogram acquiring part 102. More specifically, authentication part 103 converts the time-series electromyogram into signals in the frequency domain by Fast Fourier Transform. Authentication part 103 puts the signals in the frequency domain into a neural network and authenticates the identity of the user on the basis of the result of output according to the input signals. Authentication part 103 outputs a result of the authentication about the identity of the user to state transition part 104.

Figure 4:
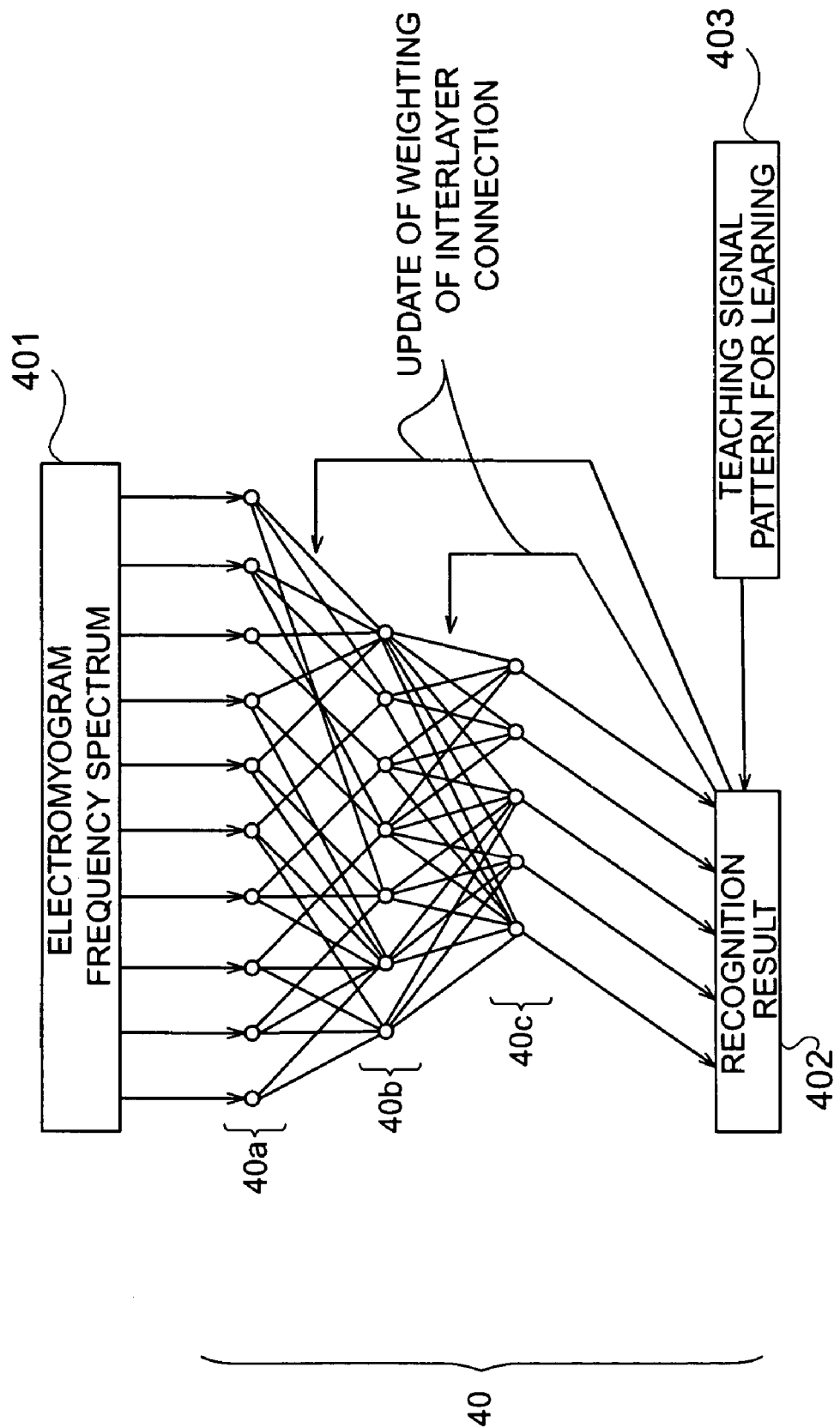
FIG. 4 is an illustration for explaining a neural network used in an embodiment of the present invention.
Figure 5:
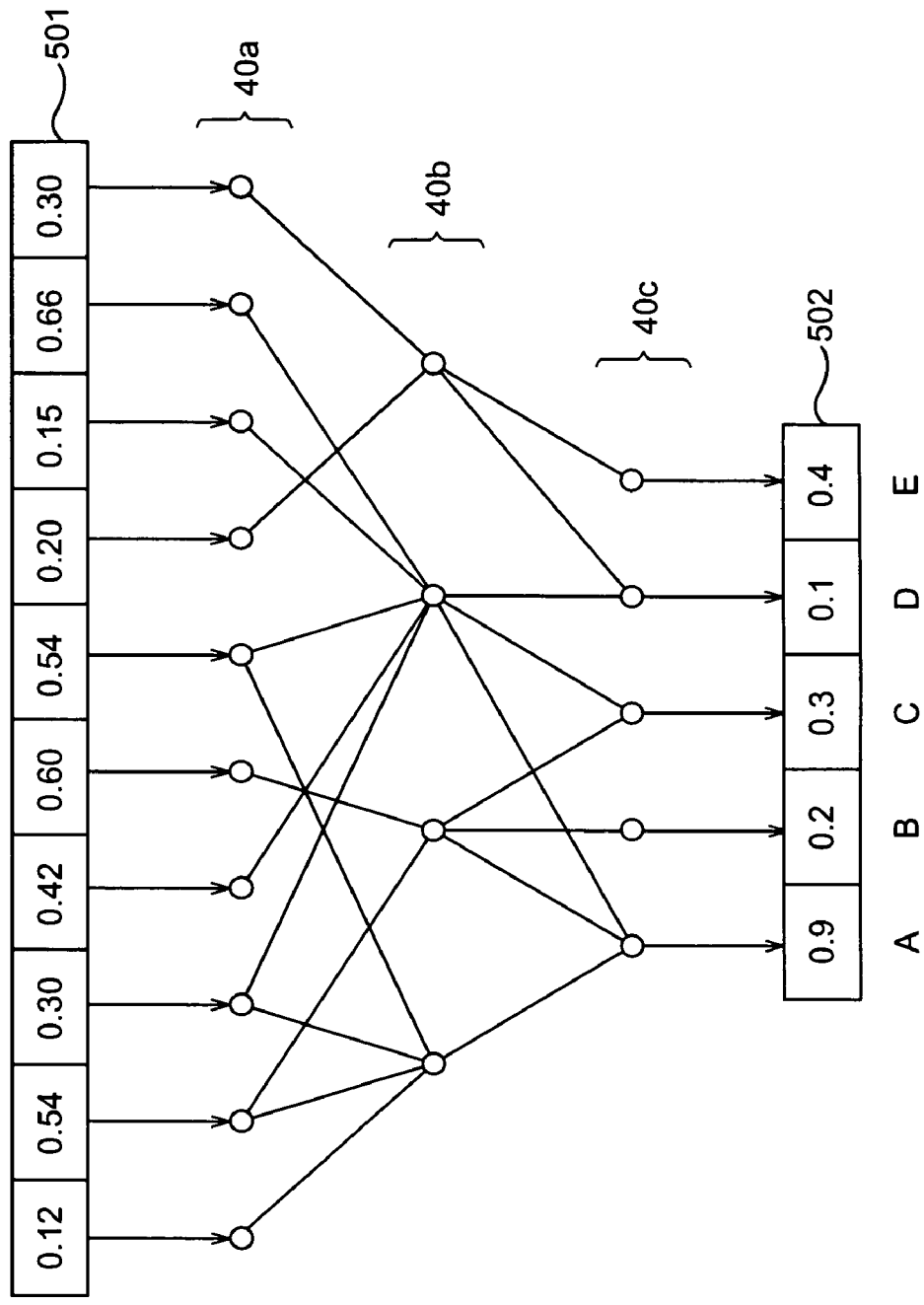
FIG. 5 is an illustration for explaining the neural network used in the embodiment of the present invention.
Figure 6:
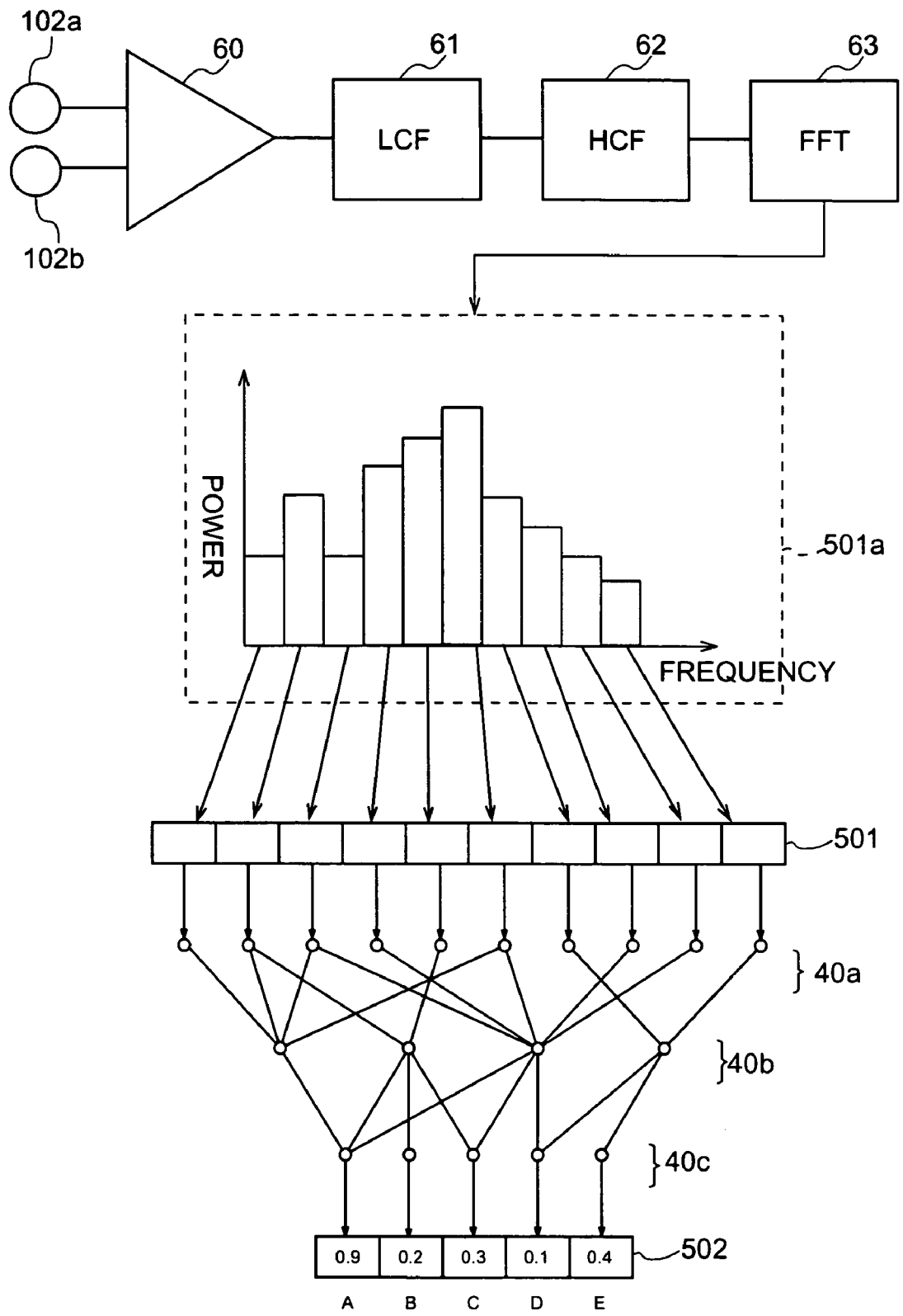
FIG. 6 is an illustration for explaining the neural network used in the embodiment of the present invention.

FIG. 4 is an illustration for explaining an example of the authentication operation using the neural network. Referring to the example of FIG. 4, neural network 40 in the present embodiment consists of input layer 40a, intermediate layer 40b, and output layer 40c. Electromyogram frequency spectrum 401 resulting from the conversion of the electromyogram to the signals in the frequency domain is fed into input layer 40a. Output layer 40c outputs recognition result 402 for identification of the identity of the user. The identity is judged based on this recognition result 402. More specifically, as shown in FIGS. 5 and 6, the electromyogram acquired by first electrode 102a and second electrode 102b of electromyogram acquiring part 102 is passed through differential amplifier 60, low-cut filter 61, and high-cut filter 62 to be subjected to Fast Fourier Transform based on the ⅓ octave analysis in FFT part 63. For example, power values 501a of respective bands are calculated in ten frequency bands from the electromyogram by Fast Fourier Transform based on the ⅓ octave analysis to obtain data set 501 of "0.12, 0.54, 0.30, 0.42, 0.60, 0.54, 0.20, 0.15, 0.66, and 0.30," and the data set 501 is fed as electromyogram frequency spectrum 401 into neural network 40. The center frequencies of the ten frequency bands are 63 Hz, 80 Hz, 100 Hz, 125 Hz, 160 Hz, 200 Hz, 250 Hz, 315 Hz, 400 Hz, and 500 Hz from the lowest (from the left in FIGS. 5 and 6). In a case where five output signals 502 are obtained as in the present embodiment, for example, "Person A," "Person B," "Person C," "Person D," and "Person E" are allocated to the respective signals and the result indicates that the user is the person corresponding to the signal demonstrating the maximum output. If five output signals 502 are "0.9, 0.2, 0.3, 0.1, and 0.4," the first signal demonstrates the maximum and the user is identified as "Person A" allocated to that signal.

Neural network 40 learns while updating weighting of interlayer connection between input layer 40a and intermediate layer 40b and between intermediate layer 40b and output layer 40c. This learning is executed in such a way that the recognition result 402 with input of electromyogram frequency spectrum 401 into neural network 40 is compared with teaching signal pattern 403 for learning to determine whether the error between them falls within a predetermined range and that the weighting is updated based on the result of the determination. For example, where five output signals 502 are obtained as in the present embodiment, "Person A," "Person B," "Person C," "Person D," and "Person E" are allocated to the respective signals. In this case, a teaching signal corresponding to "Person A" is "1, 0, 0, 0, 0" and the learning is effected according to the result of the comparison between this teaching signal and the output signal (e.g., "0.9, 0.2, 0.3, 0.1, 0.4"). The learning of neural network 40 is implemented, for example, by error back propagation (e.g., reference is made to Hideki Aso, "Neural network information processing," Sangyotosho, 1988).

State transition part 104 is a portion that outputs an instruction signal to make a transition into a state in which the user can use the predetermined function of functional part 101, to functional part 101, in accordance with the result of the authentication at authentication part 103. More specifically, when the identity of the user is verified, state transition part 104 outputs an instruction signal to make a transition into the state in which the user can use the function of functional part 101, to functional part 101; otherwise, state transition part 104 outputs no instruction signal.

Figure 7:
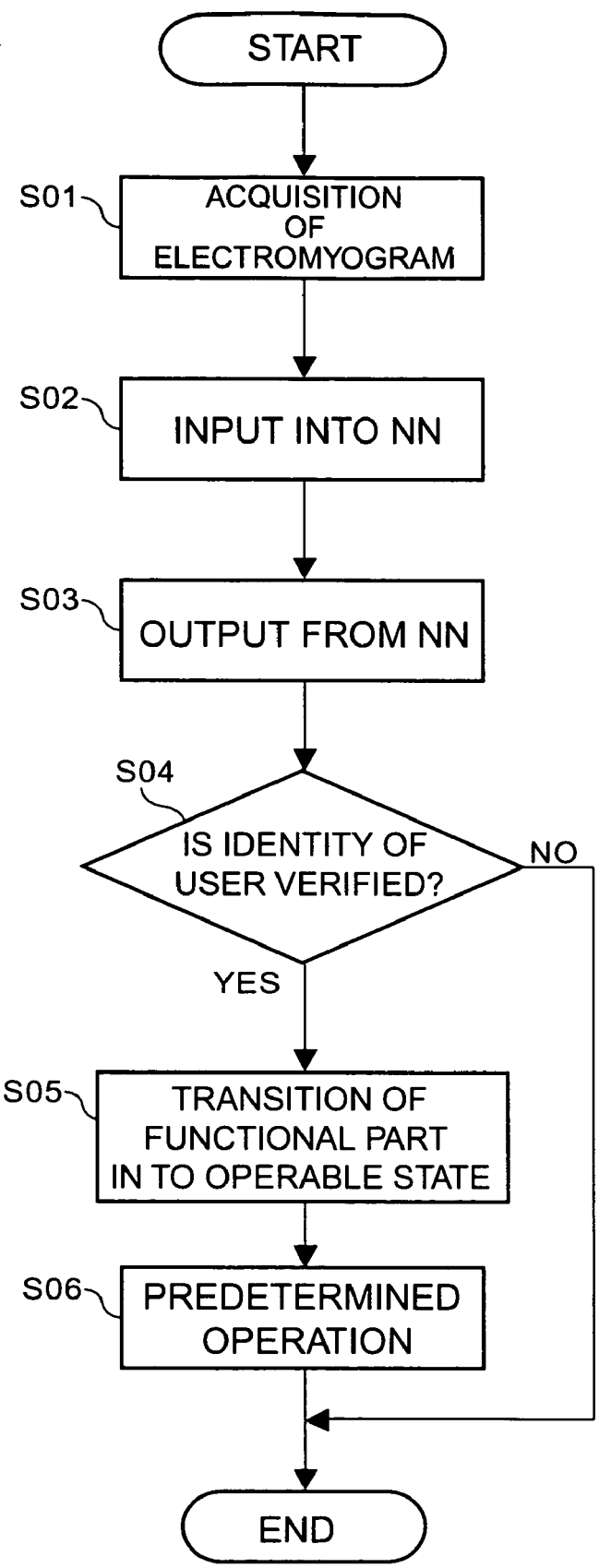
FIG. 7 is an illustration showing a method of carrying out authentication with the authentication apparatus as an embodiment of the present invention.

Subsequently, the method of conducting authentication of the user with authentication apparatus 10 will be described referring to FIG. 7. FIG. 7 is a flowchart showing the method of conducting authentication of the user. Electromyogram acquiring part 102 of authentication apparatus 10 acquires the electromyogram of the user and outputs it to authentication part 103 (step S01). When authentication apparatus 10 is a device of the watch type, the user performs a predetermined action, for example, a series of motion of "rock (fist clenching), scissors (raising the index finger and middle finger from the fist clenching state), and paper (spreading the palm)," and the electromyogram acquiring part 102 acquires the electromyogram according to the motion and outputs the electromyogram to authentication part 103.

Authentication part 103 performs the Fast Fourier Transform of the time-series electromyogram to obtain the electromyogram frequency spectrum, and feeds the spectrum into the neural network (step S02). The neural network outputs the recognition result (step S03). The identity of the user is checked based on this recognition result (step S04). When the identity of the user is verified, authentication part 103 outputs a signal indicating the fact to the state transition part 104. State transition part 104 outputs an instruction signal to enable the use of the predetermined function of functional part 101, according to the output (step S05). Functional part 101 turns into the usable state of the predetermined function in response to the instruction signal to become able to perform the predetermined operation (step S06). When step S04 results in failure in verifying the identity of the user, the processing is directly terminated.

Figure 8:
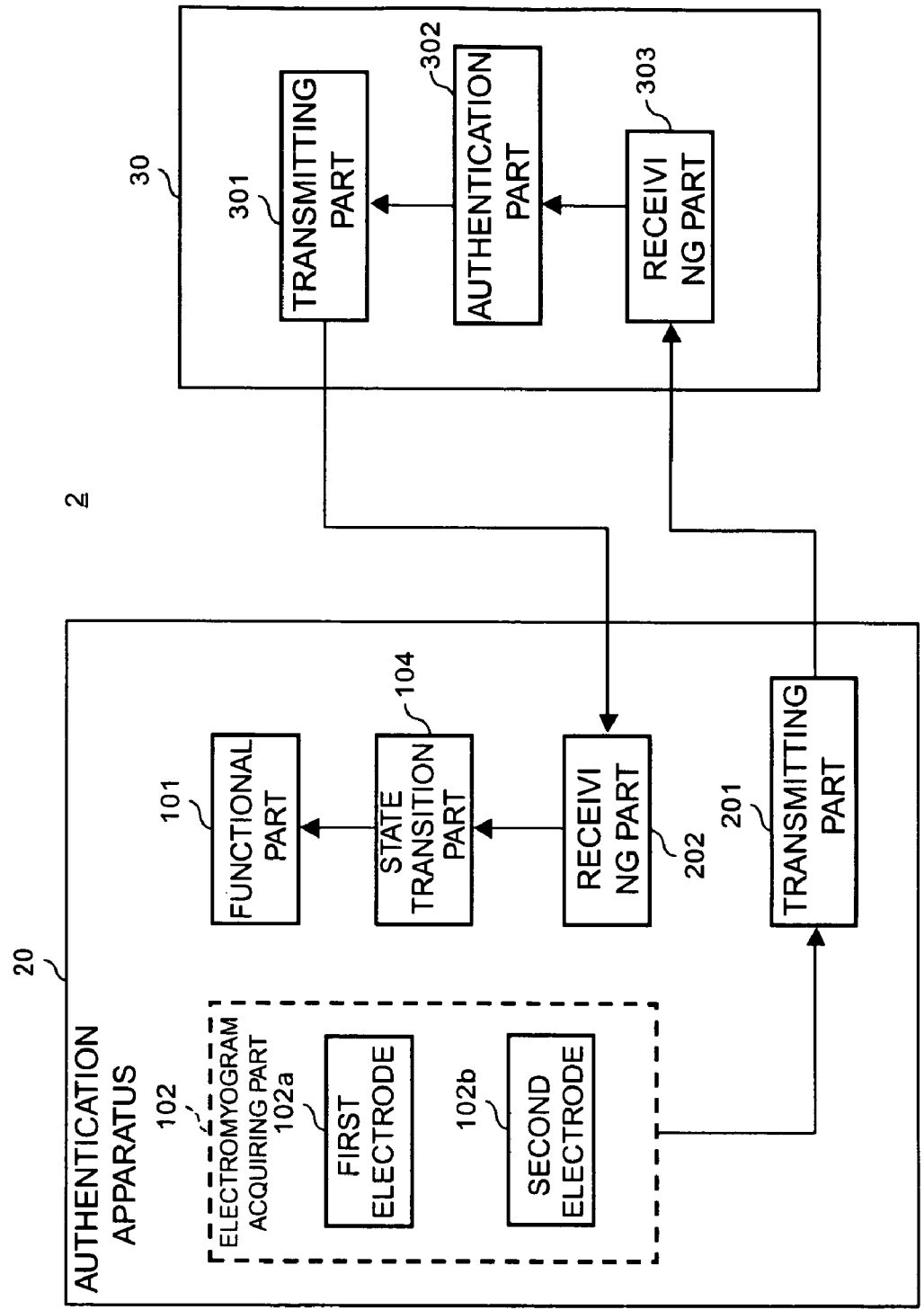
FIG. 8 is an illustration for explaining an authentication system as an embodiment of the present invention.

An authentication system as a second embodiment of the present invention will be described referring to FIG. 8. FIG. 8 is an illustration for explaining authentication system 2 including authentication apparatus 20 and external authentication apparatus (destination apparatus) 30. The authentication apparatus 20 and external authentication apparatus 30 are configured so as to be able to transmit and receive data to and from each other through an information communication network not shown.

Authentication apparatus 20 is physically constructed as personal information equipment provided with a CPU (central processing unit), memories such as RAM and ROM, electrodes for measuring the electromyogram, a functional part carrying out a predetermined function, a modem part and an antenna part for transmission and reception of data, and so on. The predetermined function is one set according to a function required of authentication apparatus 20 and is properly selected from such functions as the clock function, telephone function, data management function, and television telephone function. Therefore, authentication apparatus 20 functions as a watch in the case of the predetermined function being the clock function, functions as a wireless phone in the case of the predetermined function being the telephone function, or functions as a PDA (Personal Digital Assistance) in the case of the predetermined function being the data management function.

Authentication apparatus 20 includes as functional components, functional part 101, electromyogram acquiring part (electromyogram acquiring means) 102, state transition part (state transition means) 104, transmitting part (transmitting means) 201, and receiving part (receiving means) 202. Subsequently, each of the components will be described below in detail.

The functions of functional part 101, electromyogram acquiring part 102, and state transition part 104 are similar to those described in the first embodiment and the description thereof is omitted herein. In the second embodiment, the electromyogram measured by electromyogram acquiring part 102 is fed to transmitting part 201. State transition part 104 operates according to output from receiving part 202.

Transmitting part 201 is a portion that transmits the electromyogram as a result of the measurement outputted from the electromyogram acquiring part 102, to the external authentication apparatus 30. More specifically, transmitting part 201 amplifies and modulates the electromyogram to amplify the power to a predetermined power, and thereafter radiates a radio wave to transmit the electromyogram. In the present embodiment, the electromyogram is transmitted as an analog signal as it is, but it may be transmitted after converted into a digital signal.

Receiving part 202 is a portion that receives the result of authentication returned based on the transmission of the electromyogram from transmitting part 201 and outputs it to state transition part 104. More specifically, the receiving part receives the result of authentication transmitted from external authentication apparatus 30, effects predetermined demodulation processing and others thereon, and outputs the result to state transition part 104.

Subsequently, external authentication apparatus 30 will be described. External authentication apparatus 30 is physically constructed as a computer system provided with a CPU (central processing unit), memories, input devices such as a mouse and a keyboard, a display device such as a display unit, a storage device such as a hard disk, and so on.

External authentication apparatus 30 includes as functional components, transmitting part 301, authentication part 302, and receiving part 303. Subsequently, each of the components will be described below in detail.

Receiving part 303 is a portion that receives the electromyogram transmitted from authentication apparatus 20, effects predetermined demodulation processing and others thereon, and outputs the result to authentication part 302. Authentication part 302 is a portion that carries out the authentication of the user, based on the electromyogram received by receiving part 303. More specifically, authentication part 303 converts the time-series electromyogram into signals in the frequency domain by Fast Fourier Transform. Authentication part 303 feeds the signals in the frequency domain into the neural network and authenticates the identity of the user on the basis of the result of the output according to the input signals. Authentication part 303 outputs the result of the authentication about the identity of the user to transmitting part 301. Transmitting part 301 is a portion that transmits the result of the authentication at authentication part 302 to authentication apparatus 20.

Subsequently, a method of carrying out the authentication of the user with authentication system 2 will be described referring to FIG. 9. FIG. 9 is a flowchart showing the method of carrying out the authentication of the user. Electromyogram acquiring part 102 of authentication apparatus 20 acquires the electromyogram of the user and outputs it to transmitting part 201 (step S11). Transmitting part 201 transmits the electromyogram to external authentication apparatus 30 (step S12). Receiving part 303 of external authentication apparatus 30 receives the electromyogram and outputs it to authentication part 302 (step S13).

Authentication part 302 performs the Fast Fourier Transform of the time-series electromyogram and feeds the result as an electromyogram frequency spectrum into the neural network (step S14). The neural network outputs the recognition result (step S15). The identity of the user is judged based on this recognition result, and the result of the judgment is outputted to transmitting part 301. Transmitting part 301 transmits the result of the judgment to authentication apparatus 20 (step S16).

Receiving part 202 of authentication apparatus 20 receives the result of the judgment transmitted from external authentication apparatus 30 and outputs it to state transition part 104 (step S17). State transition part 104 determines whether the result of the judgment verifies the identity of the user (step S18). When the result of the judgment verifies the identity of the user, state transition part 104 outputs an instruction signal to enable the use of the predetermined function of functional part 101 (step S19). Functional part 101 turns into the usable state of the predetermined function in response to the instruction signal to become able to perform the predetermined operation (step S20). When step S18 results in failure in verifying the identity of the user, the processing is directly terminated.

In the description above the electromyogram and electromyogram frequency spectrum were handled in the form of analog signals, but they may also be handled in the form of digital signals. In that case, for example, the levels of ten bands measured by ten pairs of electrodes are preferably expressed by 8-byte floating point expression. In a preferred example of this case, one byte out of eight bytes is used for the characteristic, and remaining seven bytes for the mantissa (decimal fraction). When the number of bands is 10, it is necessary to use ten 8-byte values. As a result, the electromyogram frequency spectrum is expressed by 80 bytes.

In the description above the authentication by motion of the hand was described, but, for example, in the case where the authentication apparatus is of the wireless phone type as shown in FIG. 2, the authentication can be implemented by letting the user say predetermined words.

In the present embodiment, since the transition is made into the usable state of the predetermined function (the clock function, telephone function, data management function, or television telephone function) according to the result of authentication of the user based on the change of the electromyogram, it becomes feasible to implement the authentication of the user more securely. The possibility of unauthorized use by third parties can be effectively reduced without need for the user to enter a password.

In the first embodiment, since authentication apparatus 10 includes authentication part 103, it can perform the processing without communication with another device on the occasion of conducting the authentication of the user on the basis of the electromyogram.

In the second embodiment, since the authentication apparatus transmits the measured electromyogram to external authentication apparatus 30 and receives the authentication result according to the transmission, it becomes feasible to implement the authentication of the user by authentication part 302 in the external authentication apparatus 30.

In the embodiments of the present invention, since the neural network is used as authentication means, it becomes feasible to implement the authentication with higher reliability.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. An authentication apparatus comprising:
a functional part carrying out a predetermined function to be used by a user;
electromyogram acquiring means for measuring a change of an electromyogram caused by a motion of a muscle of the user;
transmitting means for transmitting a result of the measurement by the electromyogram acquiring means, to a predetermined destination apparatus;
receiving means for receiving a result of authentication of the user returned based on the result of the measurement transmitted; and
state transition means for implementing a transition into a state in which the user can use the predetermined function of the functional part, according to the result of the authentication received.

2. An authentication system comprising:
a functional part carrying out a predetermined function to be used by a user;
electromyogram acquiring means for measuring a change of an electromyogram caused by a motion of a muscle of the user;
transmitting means for transmitting a result of the measurement by the electromyogram acquiring means, to a predetermined destination apparatus;
authentication means for implementing authentication of the user on the basis of the result of the measurement transmitted;
receiving means for receiving a result of the authentication; and
state transition means for implementing a transition into a state in which the user can use the predetermined function of the functional part, according to the result of the authentication received.

3. An authentication method comprising:
an electromyogram acquiring step wherein electromyogram acquiring means measures a change of an electromyogram caused by a motion of a muscle of a user;
a transmitting step wherein transmitting means transmits a result of the measurement by the electromyogram acquiring means to a predetermined destination apparatus;
a receiving step wherein receiving means receives a result of authentication of the user returned based on the result of the measurement transmitted; and
a state transition step wherein state transition means implements a transition into a state in which the user can use a predetermined function of a functional part to be used thereby, according to the authentication of the user based on the result of the measurement.

* * * * *